(12) United States Patent
Kuschnerov et al.

(10) Patent No.: US 8,707,138 B2
(45) Date of Patent: Apr. 22, 2014

(54) METHOD AND ARRANGEMENT FOR BLIND DEMULTIPLEXING A POLARISATION DIVERSITY MULTIPLEX SIGNAL

(75) Inventors: Maxim Kuschnerov, München (DE); Berthold Lankl, Egmating (DE); Bernhard Spinnler, Oberhaching (DE)

(73) Assignee: Xieon Networks S.a.r.l., Luxembourg (LU)

(*) Notice: Subject to any disclaimer, the term of this patent is extended or adjusted under 35 U.S.C. 154(b) by 173 days.

(21) Appl. No.: 13/322,656

(22) PCT Filed: May 28, 2009

(86) PCT No.: PCT/EP2009/056532
§ 371 (c)(1),
(2), (4) Date: Nov. 28, 2011

(87) PCT Pub. No.: WO2010/136068
PCT Pub. Date: Dec. 2, 2010

(65) Prior Publication Data
US 2012/0084619 A1 Apr. 5, 2012

(51) Int. Cl.
*H03M 13/00* (2006.01)
(52) U.S. Cl.
USPC .......................................................... 714/775
(58) Field of Classification Search
None
See application file for complete search history.

(56) References Cited

U.S. PATENT DOCUMENTS

| | | | | |
|---|---|---|---|---|
| 4,757,319 A | * | 7/1988 | Lankl | 342/378 |
| 6,901,225 B1 | * | 5/2005 | Noe | 398/206 |
| 7,254,500 B2 | * | 8/2007 | Makeig et al. | 702/75 |
| 7,302,066 B2 | * | 11/2007 | Balan et al. | 381/94.7 |
| 7,315,575 B2 | * | 1/2008 | Sun et al. | 375/229 |
| 7,414,582 B1 | * | 8/2008 | Thornton et al. | 342/423 |
| 8,175,692 B2 | * | 5/2012 | Kimura et al. | 600/511 |
| 2003/0204380 A1 | * | 10/2003 | Dishman et al. | 702/189 |
| 2012/0070159 A1 | * | 3/2012 | Ishihara et al. | 398/202 |

OTHER PUBLICATIONS

Zhang H et al: "Polarization demultiplexing based on independent component analysis in optical coherent receivers" Optical Communication, 2008. ECOC 2008. 34th European Conference on, IEEE, Piscataway, NJ, USA, Sep. 21, 2008, pp. 1-2, XP031380905 ISBN: 978-1-4244-2227-2.
Seb J Savory: "Digital filters for coherent optical receivers" Optics Express, OSA (Optical Society of America), Washington DC, (US), vol. 16, No. 2, Jan. 21, 2008, pp. 804-817, XP007906766 ISSN: 1094-4087.

* cited by examiner

*Primary Examiner* — Daniel McMahon
(74) *Attorney, Agent, or Firm* — Laurence A. Greenberg; Werner H. Stemer; Ralph E. Locher (57) ABSTRACT

A received optical signal is coherently demodulated and converted into orthogonal x-polarization samples, and y-polarization samples. These samples are converted into signal x-samples and signal y-samples by an FIR butterfly filter. Correction values are calculated in an error calculating circuit of a control unit and added to filter transfer functions derived by a standard algorithm to determine corrected filter coefficients. Degenerate convergences calculating the transfer functions are avoided.

11 Claims, 4 Drawing Sheets

METHOD AND ARRANGEMENT FOR BLIND DEMULTIPLEXING A POLARISATION DIVERSITY MULTIPLEX SIGNAL

FIELD OF THE INVENTION

The invention refers to a method and an arrangement for blind demultiplexing of polarisation diversity signals for a coherent receiver.

BACKGROUND OF THE INVENTION

In order to meet the growing demand for internet bandwidth with traffic growth rates around 40-50% per year, telecommunication component providers face the task of increasing the spectral efficiency of fiber utilization. After 10 Gbit/s systems (G—Giga) became successful in the 1990's, solutions for 40 Gbit/s became available in the last years. Standardization and research are now focused on the development of 100 Gbit/s systems with coherent polarisation multiplexed (CP) QPSK being the most likely modulation format for next generation systems. Since polarisation multiplexing utilizes both light polarisations, it is possible to send the signal at a rate of ~25-28 Gsymbols per second, thus fitting nicely into the standard 50 GHz grid for DWDM (Dense Wavelength Diversity Multiplex) optical systems.

In some applications, like point-to-point radio systems, where polarisation multiplexing is employed, a visual line of sight is given, so that transmitter and receiver polarisations can be aligned during installation, and usually only small variations of the polarisation occurs.

Manually aligning the transmitter and receiver polarisations is not possible for fiber links with time-varying polarisation changes. Other solutions have been proposed for optical fiber systems like polarisation controllers. In fiber optic systems, polarisation changes arbitrarily with time and an adaptive optical polarisation controller is complicated and expensive. Moreover, PDL (polarisation depending loss) leads to a polarisation-dependent attenuation, thereby causing different SNR-levels (signal-to-noise ratio) for the two polarisations.

Since coherent reception also enables the separation of orthogonally polarized signals in the electrical domain, the use of a similar polarisation controller is not needed nor economically viable.

Current fiber network standards do not incorporate training sequences, so that in the receiver the channel has to be estimated blindly without any further knowledge.

E. g. Seb J. Savory, "Digital filters for coherent optical receivers", Optics Express 16, No. 2, pp. 804-817, 9. January 2008 describes the principles of digital coherent receivers. Savory describes especially blind polarisation demultiplexing by multidimensional digital filtering and compensation of polarisation independent impairments by dispersion compensators and of polarisation dependent impairments by a multidimensional filter referred to as a butterfly filter.

Two algorithms are applied, the LMS (Least Mean Square) algorithm is employed after the carrier phase has been acquired, and the received symbols are compared with ideal symbols in order to derive errors for channel tracking, and the CMA (constant modulus algorithm) that is used for initial acquisition without requiring carrier phase compensation, where the goal is to achieve symbols of equal power. Applying these equalisation algorithms can lead to degenerative solutions, where one polarized signal is demultiplexed to both output polarisations and half of the information lost.

OBJECTS AND SUMMARY OF THE INVENTION

It is an object of the invention to provide a method and an arrangement for blind polarisation demultiplexing.

The object is achieved by the features recited in a claimed method and arrangement.

The present invention provides a method for blind demultiplexing of a polarisation diversity multiplex signal in a coherent receiver deriving x-polarisation samples and orthogonal y-polarisation samples of the received polarisation diversity multiplex signal, calculating complex functions of a multidimensional filter between said x-polarisation samples, y-polarisation samples and output signal x-samples, output signal y-samples representing optical signals received as polarisation diversity multiplex signal the method comprising the steps of calculating at least one error correction factor of both output signal samples, calculating correction values from the at least one error correction factor multiplied by an update factor and by a x-polarisation sample or y-polarisation sample, and calculating corrected filter coefficients by adding the correction values to the filter coefficients determining corrected transfer functions.

The present invention further provides an arrangement for blind demultiplexing of a polarisation diversity multiplex signal in a coherent receiver with a multidimensional filter receiving x-polarisation samples and y-polarisation samples of the received polarisation diversity multiplex signal and with a control unit determining complex filter functions by a standard equalisation algorithm of the multidimensional filter and outputting signal x-samples and signal y-samples representing optical signals ($S_H$ and $S_V$) of the received polarisation diversity multiplex signal the arrangement comprising an error calculating circuit including a first storage storing the signal x-samples and a second storage storing the signal y-samples, a plurality of calculation branches calculating correlation factors from the actual and stored signal x-samples and signal y-samples, a maximum detector selecting a maximum correlation value, and selection circuits and a further multiplier calculating an error correction factor of the maximum correlation function and the associated signal x-sample or signal y-sample, and the control unit calculating error correction values by multiplying the error correction factor by an update factor and by an associated x- or y-polarisation sample, and calculating corrected filter coefficients by adding the correction values to the filter coefficients determining corrected transfer functions.

Advantageous features are described in the pending claims.

BRIEF DESCRIPTION OF THE DRAWINGS

Examples of the invention including a presently preferred embodiment are described below with reference to accompanying drawings, where.

DETAILED DESCRIPTION OF THE INVENTION

An embodiment of the invention will be described as a part of a coherent polarisation diversity multiplex (polmux) receiver. This system transmits two optical signals $S_H$ and $S_V$ with the same carrier wavelength but orthogonal polarisations in two subchannels of a single-carrier transmission channel.

Figure 1:
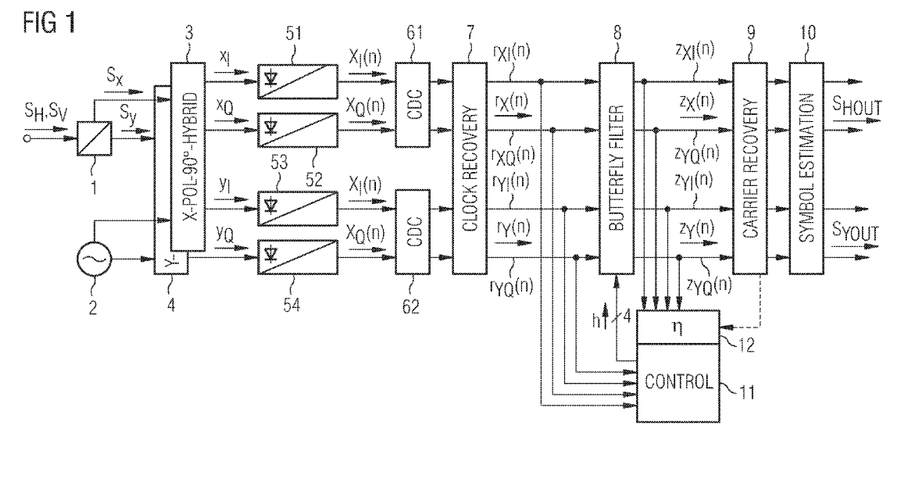
FIG. 1 is a schematic block diagram of a coherent receiver with polarisation demultiplexing.

FIG. 1 shows a schematic block diagram of a today's polarisation multiplex receiver. The received polmux (polarisation diversity multiplex) signal $S_H$, $S_V$ is split by a polarisation beam splitter 1 into an x-component signal $S_X$ with x-polarisation and an orthogonal y-component signal $S_Y$ with y-polarisation. A local oscillator 2 generates a constant wave signal, which is split into two orthogonally polarized constant wave signals and fed together with the orthogonal component signals Sx and Sy to two 90° hybrids 3 and 4, where each x- and y-component signal is split into two orthogonal components $x_I$, $x_Q$ and $y_I$, $y_Q$ respectively (in-phase component I, quadrature component Q or real and imaginary component). These components are converted by converter units 51-54 into digital complex x-samples $X_I(n)+jX_Q(n)$ and y-samples $Y_I(n)+jY_Q(n)$ in the electrical domain (n–time instant).

These complex samples $X_I(n)+jX_Q(n)$ and $Y_I(n)+jY_Q(n)$ still carry all the information of the optical component signals Sx and Sy (which usually are not the transmitted signals).

These samples are often dispersion compensated by separate dispersion compensation units 61 and 62 (CDC–chromatic dispersion compensation). Subsequently the timing phase and frequency offsets are corrected in an interpolator and clock recovery unit 7 known to those skilled in the art in order to enable fast equalizer convergence. Then these corrected filter input samples $r_x(n)=r_{XI}(n)+jr_{XQ}(n)$ and $r_y(n)=r_{YI}(n)+jr_{YQ}(n)$,—also referred to as "x-polarisation samples" and "y-polarisation samples"—are fed to a FIR (finite impulse response) butterfly equalizer 8 (implemented as filter or as digital processor with the same functionality), which reconstructs the received optical signals $S_H$, $S_V$ in a sample format as x-signal samples $z_x(n)=z_{XI}(n)+jz_{XQ}(n)$ and y-signal samples $z_y(n)=z_{YI}(n)+jz_{YQ}(n)$ (the r and z in-phase and quadrature samples are only shown in FIG. 1). The x-signal samples and y-signal samples are fed to a carrier recovery unit 9 and a error calculation circuit, which is a part of an equalizer control unit 11. A symbol estimation 10 unit outputs retrieved signals $S_{HOUT}$ and $S_{VOUT}$ derived from the x-signal samples and y-signal samples respectively.

Figure 2A:
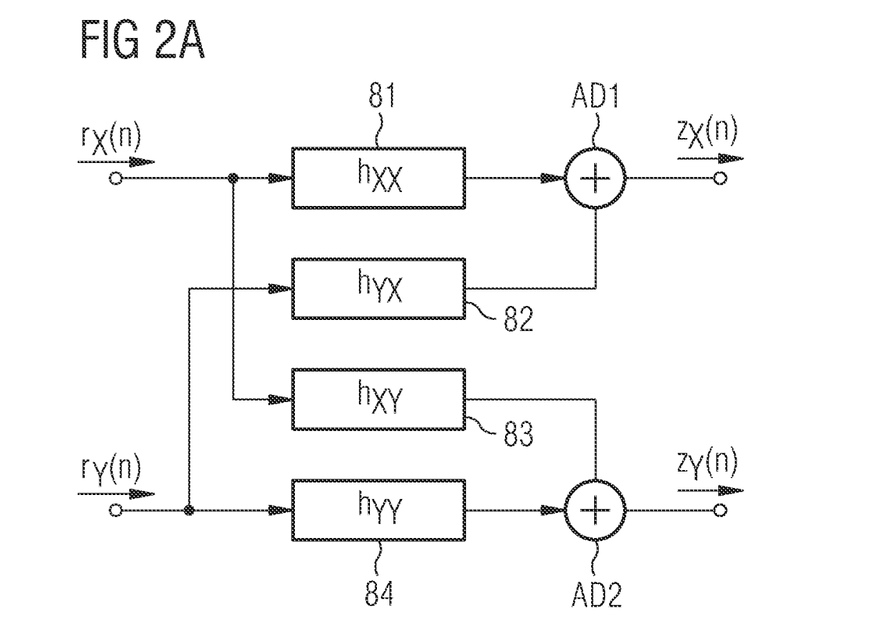
FIG. 2 shows a schematic block diagram of a butterfly equalizer.
Figure 2B:
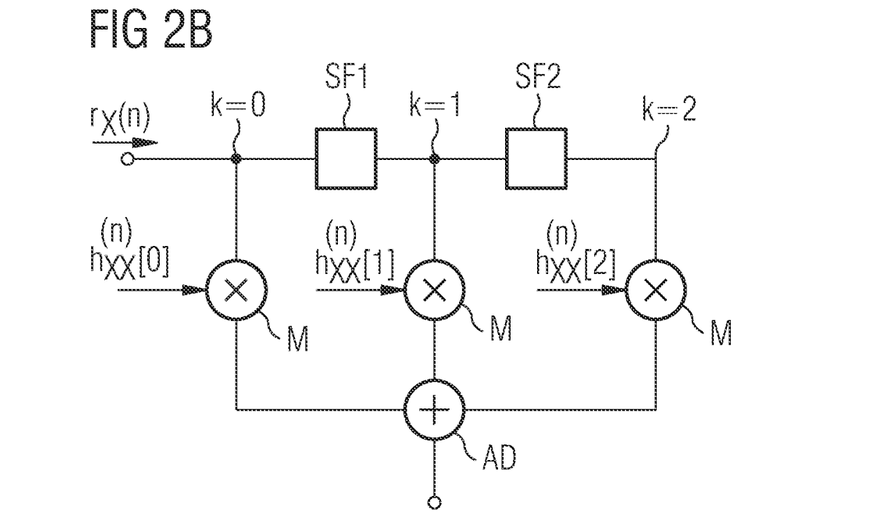

FIG. 2a shows a more detailed block diagram of the multidimensional butterfly equalizer and FIG. 2b shows an embodiment of an FIR filter with N=3 taps. The complex x-polarisation samples $r_X(n)$ and y-polarisation samples $r_Y(n)$ are fed to inputs of the FIR butterfly equalizer 8. The butterfly equaliter 8 includes four FIR filters 81-84 with time domain filter functions $h_{XX}$, $h_{YX}$, $h_{XY}$, $h_{YY}$ and two adders AD1 and AD2 (index xy means from x to y). These filter functions are adapted to the changing polarisation of the received polmux signal. The output signals of the filters 81 and 82 are combined by the adder AD1 and the output signals of the filters 83 and 84 are combined by the adder AD 2. The combined equalizer output x-signal samples $z_x(n)$ and y-signal samples $z_y(n)$ represent the transmitted optical signals $S_H$, $S_V$. A control unit 11 calculates the filter functions, more precisely the filter coefficients by standard equalisation algorithms as LMS and CMA and adds correction values derived according to the present invention.

The FIR filter with N=3 taps illustrated in FIG. 2b comprises two storage stages SF1 and SF2. The filter taps for k=1, 2, 3 are connected via multipliers M implementing the filter coefficients $h_{xx}^{(n)}[0]$, $h_{xx}^{(n)}[1]$ and $h_{xx}^{(n)}[2]$. The output samples are combined by an adder AD determining the filter function $h_{XX}$.

The proposed invention consists of an adaptation algorithm for the FIR butterfly filters that can be used on top of the standard equalisation algorithms in order to separate the two polarisations. While blind algorithms like CMA equalize for the linear channel distortion, the proposed blind source separation (BSS) approach evaluates the correlation between the two equalized signals corresponding to two polarisations and calculates error correction values to update the equalizer taps and decorrelate the two signals. The time averaged correlation between equalized x-signal samples $z_x[n]$ and y-signal samples $z_y[n]$ at time instant n is given by $$\rho_{xy}^{(n)}[k]=(1-\epsilon)\cdot\rho_{xy}^{(n-1)}[k]+\epsilon\cdot z_x[n]z_y^*[n-k]; k=0,\ldots,k_{max}$$

$$\rho_{yx}^{(n)}[k]=(1-\epsilon)\cdot\rho_{yx}^{(n-1)}[k]+\epsilon\cdot z_y[n]z_x^*[n-k]; k=0,\ldots,k_{max} \quad (1)$$

where $\rho$-correlation factor, $\epsilon$ is a forgetting factor ca. 0.01-0.1. $z_x$=x-signal sample, $z_y$=y-signal sample, $z_x^*$, $z_y^*$—conjugate complex signal values, k—correlation delay time variable, which corresponds to the time delay between the equalizer output x/y-signal samples/symbols.

Here, each polarisation is correlated with post cursors, thus effectively giving correlation for both precursors and post cursors. The number of correlation coefficients, which must be taken into account, depends on the number N of filter taps and a maximum timing offset between the two signals that shall be detected and removed. If it is guaranteed that there is no timing offset between the two signals at the output of the equalizer one tap would be sufficient.

The error correction factors $\eta_x$ and $\eta_y$ are given by $$\eta_x^{(n)}=-\sum_{k=0}^{k_{max}}\rho_{xy}^{(n)}[k]\cdot z_y[n-k], \quad \eta_y^{(n)}=-\sum_{k=0}^{k_{max}}\rho_{yx}^{(n)}[k]\cdot z_x[n-k], \quad (2)$$

wherein k=0, ..., $k_{max}$; k=correlation delay time variable;
$k_{max} \geq$ (N−1) for a T-spaced equalizer filter with N taps;
$k_{max} \geq$ (N−1)/2 for a T/2-spaced equalizer filter with N taps;
1/T=symbol rate.

The equalizer is updated similarly to algorithms like LMS and CMA, which are still needed for equalisation purposes. The filter coefficients $h_{xx}^{(n)}[k]$, $h_{yx}^{(n)}[k]$, $h_{xy}^{(n)}[k]$, $h_{yy}^{(n)}[k]$ at time instant n are given by $$h_{xx}^{(n)}[k]=h_{xx}^{(n-1)}[k]+\mu\cdot\eta_y^{(n)}\cdot r_y[n-k]+e_{CMA,LMS}^{(n)}$$

$$h_{yx}^{(n)}[k]=h_{yx}^{(n-1)}[k]+\mu\cdot\eta_x^{(n)}\cdot r_y[n-k]+e_{CMA,LMS}^{(n)}$$

$$h_{xy}^{(n)}[k]=h_{xy}^{(n-1)}[k]+\mu\cdot\eta_y^{(n)}\cdot r_x[n-k]+e_{CMA,LMS}^{(n)}$$

$$h_{yy}^{(n)}[k]=h_{yy}^{(n-1)}[k]+\mu\cdot\eta_x^{(n)}\cdot r_x[n-k]+e_{CMA,LMS}^{(n)}, \quad (3)$$

where $e_{CMA,LMS}$ are the updates from LMS and CMA, $r_x$, $r_y$=equalizer filter input sample values; $\mu$=update factor ca. 0.0001-0.01; index xy means from x to y; and
k=0, 1, ..., N−1—filter tap variable (depending on the filter implementation, the signal delay between filter taps indicated by k might be different from the delay of the correlation time variable used in equations (1) and (2));

$(\mu \cdot \eta \cdot [n-k])$—correction values. While equation (3) shows the update of the filter coefficients using four complex equations, the update can as well be done using 16 equivalent real update equations as is usually done in hardware implementations.

The filter functions derived by a standard algorithm are corrected by adding correction values from the second terms of these equations. It is sufficient that the two equalizer filters $h_{yx}$ and $h_{xy}$ are updated according to the invention while the other two filters are only updated according to a common algorithm.

For an implementation, the presented equations can be simplified. It is only necessary to compute the error values $\eta_x$, $\eta_Y$ from the maximum of both correlation factors $\rho_{xy}$, $\rho_{yx}$ and the associated filter output samples $z_x(n)$, $z_y(n)$ reducing the complexity of the update algorithm and therefore the circuit complexity of a calculation circuit.

$$\eta_x^{(n)} = -\rho_{xy}^{(n)}[k_x] \cdot z_y[n-k_x] \text{ for } k_x = \text{argmax}\{\rho_{xy}(k)\};$$
$$k=0,\ldots,k_{max},$$

$$\eta_y^{(n)} = -\rho_{yx}^{(n)}[k_y] \cdot z_x[n-k_y] \text{ for } k_y = \text{argmax}\{\rho_{yx}(k)\};$$
$$k=0,\ldots,k_{max},\qquad(4)$$

Figure 3:
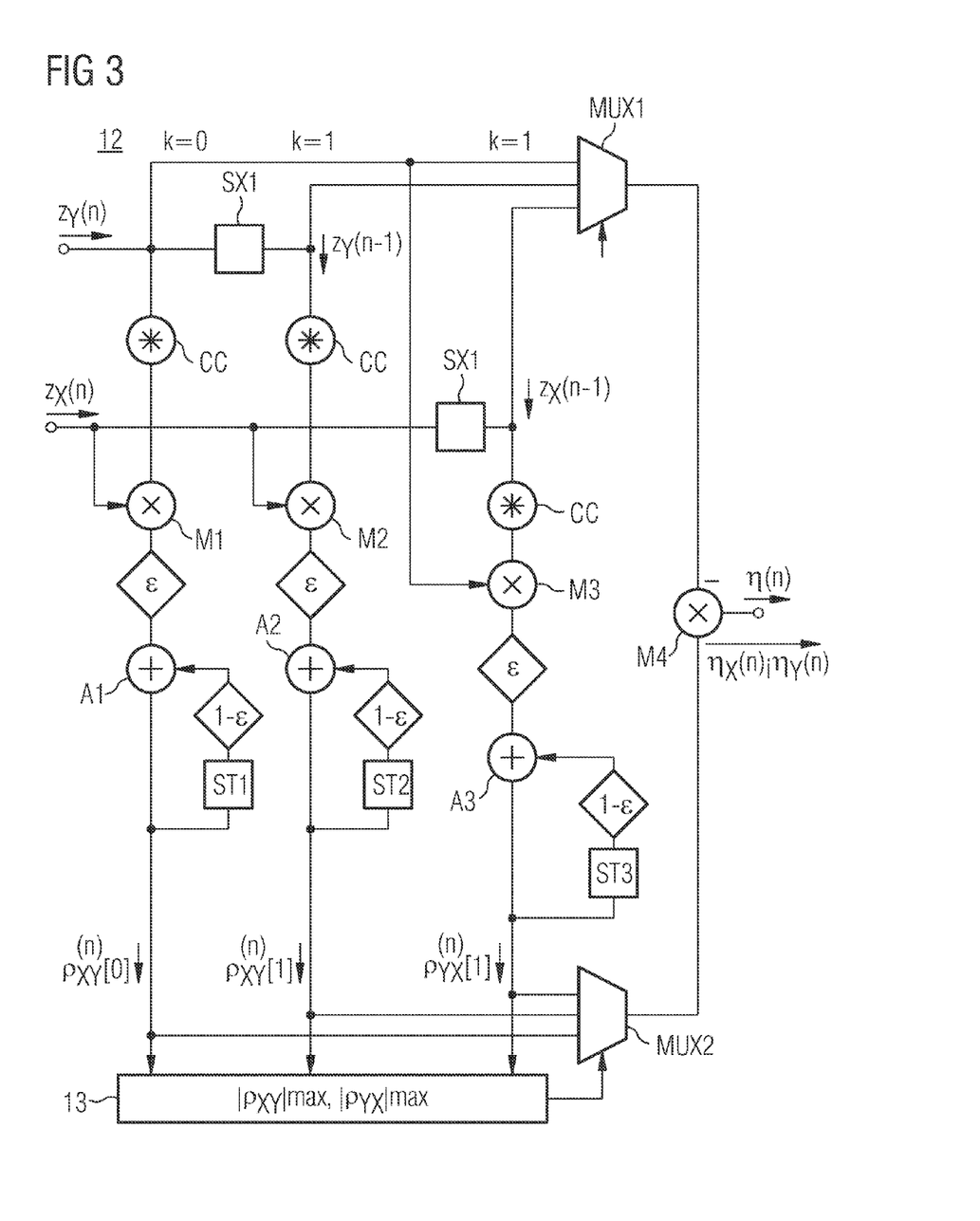
FIG. 3 is a schematic block diagram of an error calculation circuit.

The complexity is further reduced if only one error value $\eta(n)$ is derived for both polarisations in an error calculation circuit 13 as shown in FIG. 3.

A first storage SX1 receives and stores signal x-signal samples $z_X(n)$ and outputs time delayed x-signal samples $z_X(n-1)$ with the symbol rate $1/T$. A second storage SY2 receives samples $z_y(n)$ and outputs delayed y-signal samples $z_y(n-1)$, also with the symbol rate $1/T$. The number of storage stages (e.g. of a shift register) depends on the necessary correlation length and depends therefore of the number N of filter taps and filter clock rate; only one storage stage for each polarisation and k=0, 1 (N=2) is shown for reasons of clarity in this embodiment.

The correlation factors $\rho_{xy}^{(n)}[k]$, $\rho_{yx}^{(n)}[k]$ are derived according to the equations (4). Conjugate complex sample values $z_X^*(n)$ are derived from actual signal y-samples $z_y(n)$ and from time shifted signal samples $z_y(n-1)$, $z_x(n-1)$ by calculation circuits CC. The conjugate complex signal samples $z_y^*(n)$, $z_{y^*(n}-1)$ are then multiplied by an actual signal x-signal sample $z_x(n)$ by multipliers M1 and M2. The time shifted signal x-signal sample $z_x(n-1)$ is converted into a conjugate complex x-signal sample $z_x^*(n-1)$ and multiplied by the actual y-signal sample $z_y(n)$ by a multiplier M3. The result is multiplied by a forgetting factor $\epsilon$ (ca. 0.001-0.1) and added to the already stored sums in storages ST1-ST3. The sum is reduced by $(1-\epsilon)$ for each new sample by calculation circuits comprising storages ST1-ST3, multipliers $(1-\epsilon)$ and adders A1-A3. Only three calculation paths are needed for the calculation of $\eta_x$ and $\eta_y$ because $\rho_{xy}(k=0) = \rho^*_{yx}(k=0)$. Multiplications by the forgetting factor $\epsilon$ (and by the update factor $\mu$ in the control unit 11) can be simplified and replaced by bit shifting (equivalent to the division by a power of 2 for binary numbers). Of course, other stores and calculation units may be applied.

The derived correlation factors $\rho_{yx}^{(n)}[0]$, $\rho_{yx}^{(n)}[1]$, and $\rho_{xy}^{(n)}[1]$ are fed to a maximum detector 13, which selects a maximum absolute correlation value and controls a second multiplexer MUX2 and a first multiplexer MUX1. Different error values $\eta_x$, $\eta_Y$ may be calculated with a time multiplex arrangement or with an additional multiplexer. But also the calculation of a common error values $\eta(n)$ is sufficient. The correlation factor with a maximum absolute value (e.g. $\rho_{yx}$[1]) is fed via the multiplexer MUX2 to a multiplier M4 and the associated sample value (e.g. $z_y[n-1]$) is fed via the first multiplexer MUX1 to the multiplier M4. The selected correlation factor is then multiplied by the associated signal sample value according to equations (2). The negative product is a simplified common error correction factor $\eta(n)$, which is used instead of $\eta_x$, $\eta_Y$ in the equations (2) or (3) for calculating the filter coefficients. Moreover, correlation factors below a certain threshold are discarded, in order to avoid noise enhancement.

Figure 4:
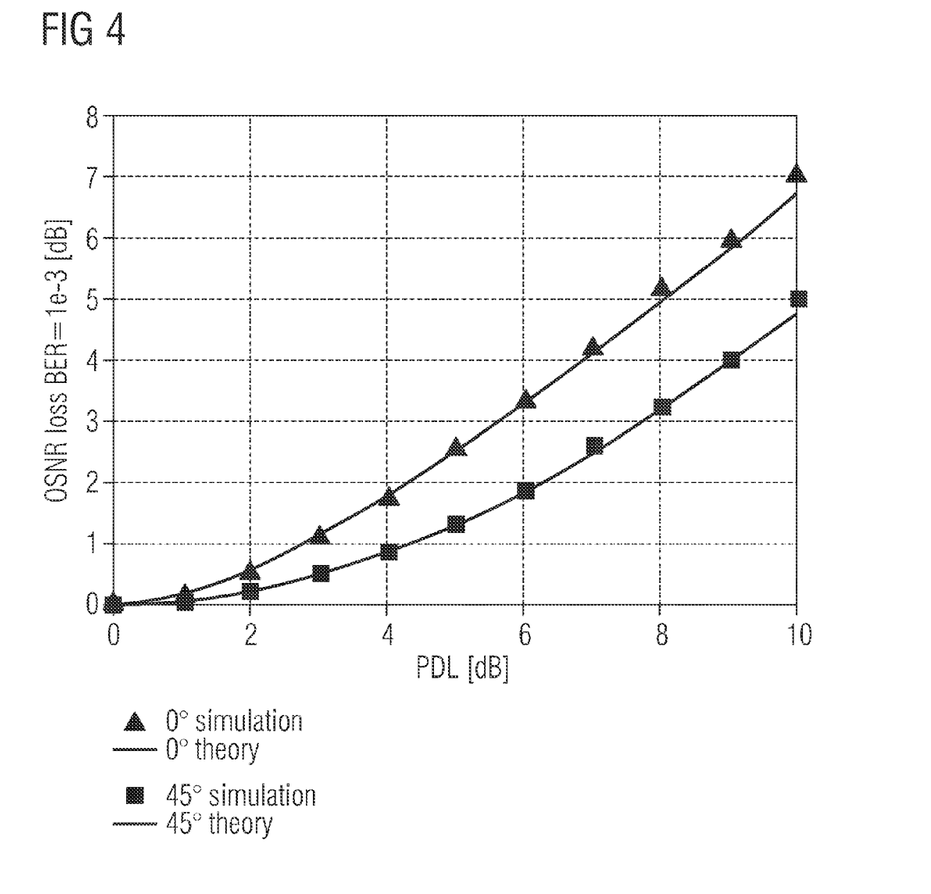
FIG. 4 shows a performance diagram.

FIG. 4 shows that the performance is in fact optimal up to worst case distortions of 10 dB for both worst case and best case PDL (polarisation depending loss). 45° alignment means that the transmission element is aligned at an angle of 45° in respect to the signal polarisations. In this example the chromatic dispersion is 1000 ps/nm, the mean DGD (Differential Group Delay) is 30 ps, and QPSK (Quadrature Phase Shift Keying) with 112 Gbit/s is used. Misconvergences were not observed.

The performance can be evaluated in presence of PDL (Polarisation-Dependent Loss) against theoretical boundaries given by the attenuation inflicted by PDL. Only if the equalizer performance is on these boundaries, the equalisation can be considered optimal. FIG. 4 shows that the performance is in fact optimal up to worst case distortions of 10 dB for both worst case and best case PDL.

The present invention is not limited to the details of the above described principles. The scope of the invention is defined by the appended claims and all changes and modifications falling within the equivalents of the scope of the claims are therefore to be embraced by the invention.

REFERENCE SIGNS

1 polarisation beam splitter
2 local oscillator
3 first 90° hybrid
4 second 90° hybrid
5 optical-electrical converters
61, 62 dispersion compensation units
7 clock recovery unit
8 butterfly equalizer
81-84 FIR filter
9 carrier recovery unit
10 symbol estimation unit
11 equalizer control unit
12 error calculation circuit
13 maximum detector
$S_H$, $S_V$ received polmux signal
$S_X$ x-component signal
$S_Y$ y-component signal
$x_I$ x in-phase component
$x_Q$ x quadrature component
$y_I$ y in-phase component
$Y_Q$ y quadrature component
$X_I$, $X_Q$ x-samples
$Y_I$, $Y_Q$ y-samples
$r_x$ x-polarisation samples (CD compensated)
$r_y$ y-polarisation samples (CD compensated)
$h_{xx}$ filter function in the time domain
$z_x$ x-signal sample
$z_y$ y-signal sample
$\eta$ error correction factor
$\rho$ correlation factor
$S_{HOUT}$, $S_{VOUT}$ retrieved signals
h transfer function
AD1 first adder AD2 second adder
SF1 first filter storage stage
SF2 second filter storage stage
M multiplier
AD adder
SX1 $z_X$-sample storage
SY1 $z_Y$-sample storage
M1, M2, ... multiplier
A1, A2, ... adder
$\epsilon$ forgetting factor
$\eta$ error factor
$\mu$ update factor
$\rho$ correlation factor
ST1, ST2, ... storage
MUX1 first multiplexer
MUX2 second multiplexer

The invention claimed is:

1. A method of blind demultiplexing a polarization diversity multiplex signal in a coherent receiver, deriving x-polarization samples $r_X(n)$ and orthogonal y-polarization samples $r_Y(n)$ of the received polarization diversity multiplex signal, calculating complex filter functions of a multidimensional equalizer between the x-polarization samples $r_X(n)$, y-polarization samples $r_y(n)$ and output x-signal samples $z_x(n)$, y-signal samples $z_y(n)$ representing optical signals received as the polarization diversity multiplex signal,
the method comprising:
calculating at least one error correction factor derived from the x-signal samples and y-signal samples $z_x(n)$, $z_y(n)$ output from the equalizer by deriving averaged correlation factors according to:

$\rho_{xy}^{(n)}[k] = (1-\epsilon) \cdot \rho_{xy}^{(n-1)}[k] + \epsilon \cdot z_x[n] z_y^*[n-k]; k=0, \ldots, k_{max}$ $\rho_{yx}^{(n)}[k] = (1-\epsilon) \cdot \rho_{yx}^{(n-1)}[k] + \epsilon \cdot z_y[n] z_x^*[n-k]; k=0, \ldots, k_{max}$, with $k=0, \ldots, k_{max}$ being a corrlation delay time variable; and
deriving error correction factors according to:

$\eta_x^{(n)} = -\rho_{xy}^{(n)}[k_x] \cdot z_y[n-k_x]$ for $k_x = \text{argmax}\{\rho_{xy}(k)\}$; $k=0, \ldots, k_{max}$, $\eta_y^{(n)} = -\rho_{yx}^{(n)}[k_y] \cdot z_x[n-k_y]$ for $k_y = \text{argmax}\{\rho_{yx}(k)\}$; $k=0, \ldots, k_{max}$, calculating correction values from the at least one error correction factor multiplied by an update factor and by an x-polarization sample or a y-polarization sample;
calculating corrected filter coefficients by adding the correction values to filter coefficients of the complex filter functions; and
wherein n is a time instant, $\rho$ is a correlation factor, $k=0, 1, \ldots, k_{max}$ is a correlation delay time variable and $\epsilon$ is a forgetting factor.

2. The method according to claim 1, which comprises calculating a common error correction factor corresponding to a maximum absolute correlation factor of the x-polarization and the y-polarizations.

3. The method according to claim 1, which comprises calculating filter transfer functions according to:

$h_{xx}^{(n)}[k] = h_{xx}^{(n-1)}[k] + \mu \cdot \eta_y^{(n)} \cdot r_x[n-k] + e_{CMA,LMS}^{(n)}$ $h_{yx}^{(n)}[k] = h_{yx}^{(n-1)}[k] + \mu \cdot \eta_x^{(n)} \cdot r_y[n-k] + e_{CMA,LMS}^{(n)}$ $h_{xy}^{(n)}[k] = h_{xy}^{(n-1)}[k] + \mu \cdot \eta_y^{(n)} \cdot r_x[n-k] + e_{CMA,LMS}^{(n)}$ $h_{yy}^{(n)}[k] = h_{yy}^{(n-1)}[k] + \mu \cdot \eta_x^{(n)} \cdot r_x[n-k] + e_{CMA,LMS}^{(n)}$, or according to:

$h_{xx}^{(n)}[k] = h_{xx}^{(n-1)}[k] + e_{CMA,LMS}^{(n)}$ $h_{yx}^{(n)}[k] = h_{yx}^{(n-1)}[k] + \mu \cdot \eta_x^{(n)} \cdot r_y[n-k] + e_{CMA,LMS}^{(n)}$ $h_{xy}^{(n)}[k] = h_{xy}^{(n-1)}[k] + \mu \cdot \eta_y^{(n)} \cdot r_x[n-k] + e_{CMA,LMS}^{(n)}$ $h_{yy}^{(n)}[k] = h_{yy}^{(n-1)}[k] + e_{CMA,LMS}^{(n)}$, wherein h is a filter coefficient, $k=0, \ldots, (N-1)$ is a filter tap variable, $\mu$ is an update factor; $r_x$ and $r_y$ are complex filter input samples with x-polarization and y-polarization, respectively, and $e_{CMA,LMS}$ is a correction signal derived by a standard algorithm.

4. The method according to claim 3, which comprises changing the transfer functions only if an absolute value of one of the correlation factors ($\rho_{xy}^{(n)}[k]$, $\rho_{yx}^{(n)}[k]$) exceeds a predetermined threshold value.

5. An arrangement for blind demultiplexing a polarization diversity multiplex signal in a coherent receiver, comprising:
a multidimensional filter receiving x-polarization samples and y-polarization samples of the polarization diversity multiplex signal received at an input;
a control unit configured for determining complex transfer functions by a standard equalization algorithm of said multidimensional filter and outputting x-signal samples and y-signal samples representing optical signals of the polarization diversity multiplex signal received at the input;
an error calculating circuit including:
a first storage device storing the signal x-samples and a second storage device storing the signal y-samples;
a plurality of calculation branches calculating correlation factors from actual and stored signal x-samples and signal y-samples;
a maximum detector selecting a maximum absolute correlation factor; and
selection circuits and a further multiplier connected to said maximum detector for calculating at least one error correction factor of the maximum correlation factor and the x-signal sample and y-signal sample respectively; and
said control unit being configured for:
calculating at least one error correction value by multiplying the error correction factor by an update factor and by an x-polarization sample or a y-polarization sample; and
calculating corrected filter coefficients by adding the correction values to filter coefficients of the complex transfer functions;
wherein:
the correlation factors are calculated accorrding to:

$\rho_{xy}^{(n)}[k] = (1-\epsilon) \cdot \rho_{xy}^{(n-1)}[k] + \epsilon \cdot z_x[n] z_y^*[n-k]; k=0, \ldots, k_{max}$ $\rho_{yx}^{(n)}[k] = (1-\epsilon) \cdot \rho_{yx}^{(n-1)}[k] + \epsilon \cdot z_y[n] z_x^*[n-k]; k=0, \ldots, k_{max}$; and error correction signals are calculated according to:

$\eta_x^{(n)} = -\sum_{k=0}^{k_{max}} \rho_{xy}^{(n)}[k] \cdot z_y[n-k], \quad \eta_y^{(n)} = -\sum_{k=0}^{k_{max}} \rho_{yx}^{(n)}[k] \cdot z_x[n-k];$ where $z_x$ and $z_y$ are x-signal samples and y-signal samples, respectively, at equalizer outputs, n is a time instant, k is a correlation delay time variable and $\epsilon$ is a forgetting factor.

6. An arrangement for blind demultiplexing a polarization diversity multiplex signal in a coherent receiver, comprising:
   a multidimensional filter receiving x-polarization samples and y-polarization samples of the polarization diversity multiplex signal received at an input;
   a control unit configured for determining complex transfer functions by a standard equalization algorithm of said multidimensional filter and outputting x-signal samples and y-signal samples representing optical signals of the polarization diversity multiplex signal received at the input;
   an error calculating circuit including:
      a first storage device storing the signal x-samples and a second storage device storing the signal y-samples;
      a plurality of calculation branches calculating correlation factors from actual and stored signal x-samples and signal y-samples;
   a maximum detector selecting a maximum absolute correlation factor;
   selection circuits and a further multiplier connected to said maximum detector for calculating at least one error correction factor of the maximum correlation factor and the x-signal sample and y-signal sample respectively; and
   said control unit being configured for:
      calculating at least one error correction value by multiplying the error correction factor by an update factor and by an associated x-or y-polarization sample; and
      calculating corrected filter coefficients by adding the correction values to filter coefficients of the complex transfer functions;
   wherein:
   the correlation factors are calculated according to:

$$\rho_{xy}^{(n)}[k]=(1-\epsilon)\cdot\rho_{xy}^{(n-1)}[k]+\epsilon\cdot z_x[n]z_y^*[n-k]; k=0, \ldots, k_{max}$$

$$\rho_{yx}^{(n)}[k]=(1-\epsilon)\cdot\rho_{yx}^{(n-1)}[k]+\epsilon\cdot z_y[n]z_x^*[n-k]; k=0, \ldots, k_{max},$$

and
   the error signals are derived according to:

$$\eta_x^{(n)}=-\rho_{xy}^{(n)}[k_x]\cdot z_y[n-k_x] \text{ for } k_x=\text{argmax}\{\rho_{xy}(k)\}; k=0, \ldots, k_{max},$$

$$\eta_y^{(n)}=-\rho_{yx}^{(n)}[k_y]\cdot z_x[n-k_y] \text{ for } k_y=\text{argmax}\{\rho_{yx}(k)\}; k=0, \ldots, k_{max}; \text{ and}$$

where n is a time instant, $\rho$ is a correlation signal, k is a correlation delay time variable, $z_x$ and $z_y$ are x-signal samples and y-signal samples, respectively, at equalizer outputs and $\epsilon$ is a forgetting factor.

7. The arrangement according to claim 5, wherein:
   said control unit is configured to calculate the filter coefficients according to:

$$h_{xx}^{(n)}[k]=h_{xx}^{(n-1)}[k]+\mu\cdot\eta_y^{(n)}\cdot r_y[n-k]+e_{CMA,LMS}^{(n)}$$

$$h_{yx}^{(n)}[k]=h_{yx}^{(n-1)}[k]+\mu\cdot\eta_x^{(n)}\cdot r_y[n-k]+e_{CMA,LMS}^{(n)}$$

$$h_{xy}^{(n)}[k]=h_{xy}^{(n-1)}[k]+\mu\cdot\eta_y^{(n)}\cdot r_x[n-k]+e_{CMA,LMS}^{(n)}$$

$$h_{yy}^{(n)}[k]=h_{yy}^{(n-1)}[k]+\mu\cdot\eta_x^{(n)}\cdot r_x[n-k]+e_{CMA,LMS}^{(n)};$$

or according to $$h_{xx}^{(n)}[k]=h_{xx}^{(n-1)}[k]+e_{CMA,LMS}^{(n)}$$

$$h_{yx}^{(n)}[k]=h_{yx}^{(n-1)}[k]+\mu\cdot\eta_x^{(n)}\cdot r_y[n-k]+e_{CMA,LMS}^{(n)}$$

$$h_{xy}^{(n)}[k]=h_{xy}^{(n-1)}[k]+\mu\cdot\eta_y^{(n)}\cdot r_x[n-k]+e_{CMA,LMS}^{(n)}$$

$$h_{yy}^{(n)}[k]=h_{yy}^{(n-1)}[k]+e_{CMA,LMS}^{(n)};$$

where h is a filter function, k=0, ..., (N−1) is a filter tap variable, $\mu$ is an update factor; $r_x$ and $r_y$ (at the equalizer input) are complex x-polarization samples and y-polarization samples, respectively; and $e_{CMA,LMS}$ is a standard correction signal derived by a standard algorithm.

8. A method of blind demultiplexing a polarization diversity multiplex signal in a coherent receiver, deriving x-polarization samples $r_x$ (n) and orthogonal y-polarization samples $r_y$ (n) of the received polarization diversity multiplex signal, calculating complex filter functions of a multidimensional equalizer between the x-polarization samples $r_x$ (n), y-polarization samples $r_y$ (n) and output x-signal samples $z_x$ (n), y-signal samples $z_y$ (n) representing optical signals received as the polarization diversity multiplex signal,
   the method comprising:
   calculating at least one error correction factor derived from the x-signal samples and y-signal samples $z_x$ (n), $z_y$ (n) output from the equalizer by deriving averaged correlation factors according to:

$$\rho_{xy}^{(n)}[k]=(1-\epsilon)\cdot\rho_{xy}^{(n-1)}[k]+\epsilon\cdot z_x[n]z_y^*[n-k]; k=0, \ldots, k_{max}$$

$$\rho_{yx}^{(n)}[k]=(1-\epsilon)\cdot\rho_{yx}^{(n-1)}[k]+\epsilon\cdot z_y[n]z_x^*[n-k]; k=0, \ldots, k_{max}$$

and deriving error correction factors according to:

$$\eta_x^{(n)}=-\sum_{k=0}^{k_{max}}\rho_{xy}^{(n)}[k]\cdot z_y[n-k], \quad \eta_y^{(n)}=-\sum_{k=0}^{k_{max}}\rho_{yx}^{(n)}[k]\cdot z_x[n-k],$$

calculating correction values from the at least one error correction factor multiplied by an update factor and by an x-polarization sample or a y-polarization sample;
   calculating corrected filter coefficients by adding the correction values to filter coefficients of the complex filter functions; and
   wherein $\rho$ is a correlation factor, n is a time instant, k is a correlation delay time index, and $\epsilon$ is a forgetting factor.

9. The arrangement according to claim 6, wherein only a common error signal $\eta(n)$ is selected according to a maximum absolute value of the correlation factors ($|\rho_{xy}^{(n)}[k]|$, $|\rho_{yx}^{(n)}[k]|$).

10. The arrangement according to claim 6, wherein:
   said control unit is configured to calculate the filter coefficients according to:

$$h_{xx}^{(n)}[k]=h_{xx}^{(n-1)}[k]+\mu\cdot\eta_y^{(n)}\cdot r_y[n-k]+e_{CMA,LMS}^{(n)}$$

$$h_{yx}^{(n)}[k]=h_{yx}^{(n-1)}[k]+\mu\cdot\eta_x^{(n)}\cdot r_y[n-k]+e_{CMA,LMS}^{(n)}$$

$$h_{xy}^{(n)}[k]=h_{xy}^{(n-1)}[k]+\mu\cdot\eta_y^{(n)}\cdot r_x[n-k]+e_{CMA,LMS}^{(n)}$$

$$h_{yy}^{(n)}[k]=h_{yy}^{(n-1)}[k]+\mu\cdot\eta_x^{(n)}\cdot r_x[n-k]+e_{CMA,LMS}^{(n)},$$

or according to:

$$h_{xx}^{(n)}[k]=h_{xx}^{(n-1)}[k]+e_{CMA,LMS}^{(n)}$$

$$h_{yx}^{(n)}[k]=h_{yx}^{(n-1)}[k]+\mu\cdot\eta_x^{(n)}\cdot r_y[n-k]+e_{CMA,LMS}^{(n)}$$

$$h_{xy}^{(n)}[k]=h_{xy}^{(n-1)}[k]+\mu\cdot\eta_y^{(n)}\cdot r_x[n-k]+e_{CMA,LMS}^{(n)}$$

$$h_{yy}^{(n)}[k]=h_{yy}^{(n-1)}[k]+e_{CMA,LMS}^{(n)},$$

where h is a filter function, k=0, ..., (N−1) is a filter tap variable, $\mu$ is an update factor; $r_x$ and $r_y$ (at the equalizer input) are complex x-polarization samples and y-polarization samples, respectively; and $e_{CMA,LMS}$ is a standard correction signal derived by a standard algorithm.

11. An arrangement for blind demultiplexing a polarization diversity multiplex signal in a coherent receiver, comprising:
   a multidimensional filter receiving x-polarization samples and y-polarization samples of the polarization diversity multiplex signal received at an input;
   a control unit configured for determining complex transfer functions by a standard equalization algorithm of said multidimensional filter and outputting x-signal samples and y-signal samples representing optical signals of the polarization diversity multiplex signal received at the input;
   an error calculating circuit including:
      a first storage device storing the signal x-samples and a second storage device storing the signal y-samples;
      a plurality of calculation branches calculating correlation factors from actual and stored signal x-samples and signal y-samples;
      a maximum detector selecting a maximum absolute correlation factor; and
      selection circuits and a further multiplier connected to said maximum detector for calculating at least one error correction factor of the maximum correlation factor and the x-signal sample and y-signal sample respectively; and
   said control unit being configured for:
      calculating at least one error correction value by multiplying the error correction factor by an update factor and by an associated x-or y-polarization sample; and
      calculating corrected filter coefficients by adding the correction values to filter coefficients of the complex transfer functions;
   wherein said control unit is configured to modify the filter functions only if an absolute value of one of the correlation factors exceeds a predetermined threshold value.

* * * * *